April 21, 1925.
L. E. STUTSMAN
1,534,334
CONVEYER SYSTEM
Filed Aug. 13, 1923
6 Sheets-Sheet 1
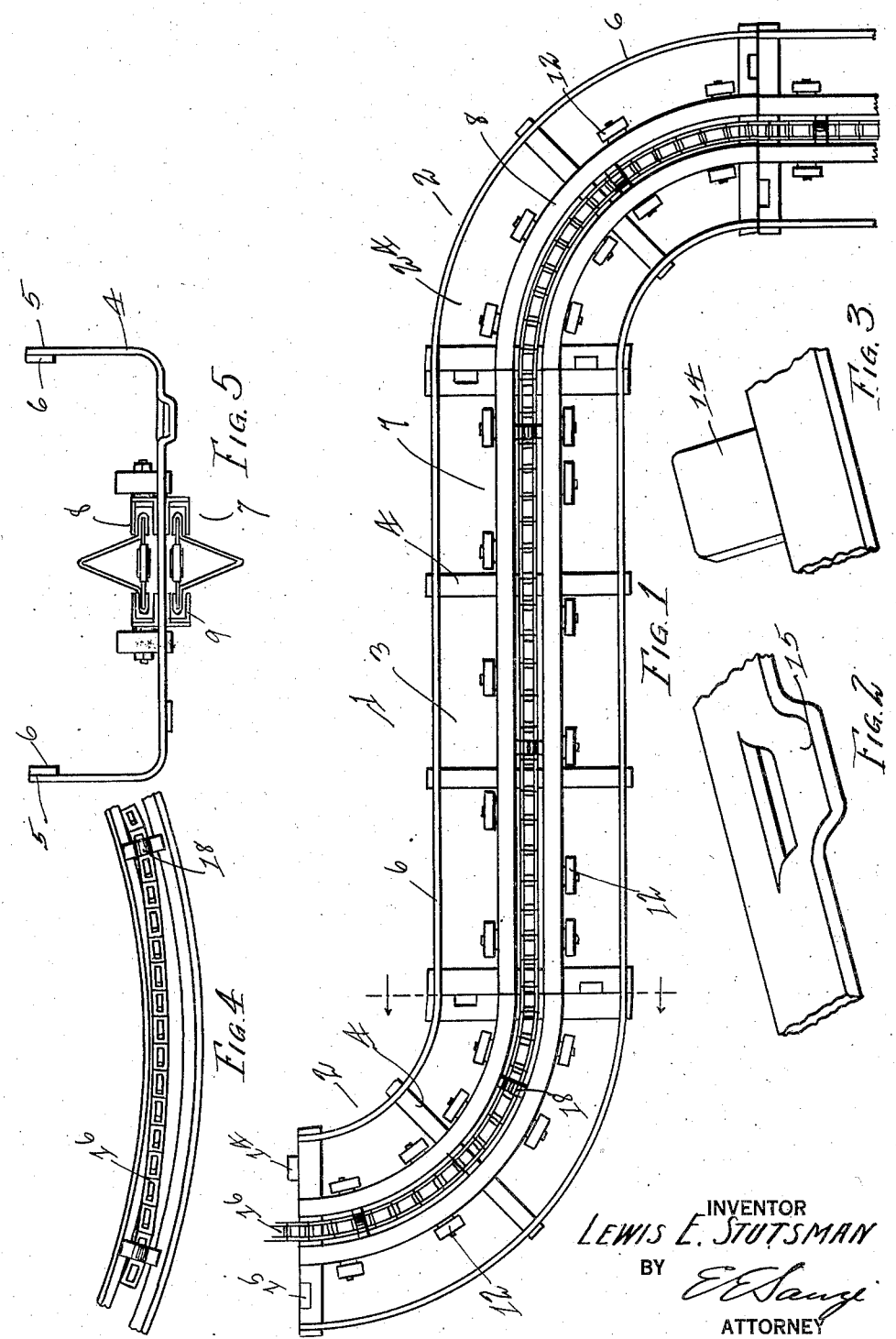
INVENTOR
LEWIS E. STUTSMAN
BY
ATTORNEY April 21, 1925.
L. E. STUTSMAN
1,534,334
CONVEYER SYSTEM
Filed Aug. 13, 1923    6 Sheets-Sheet 2
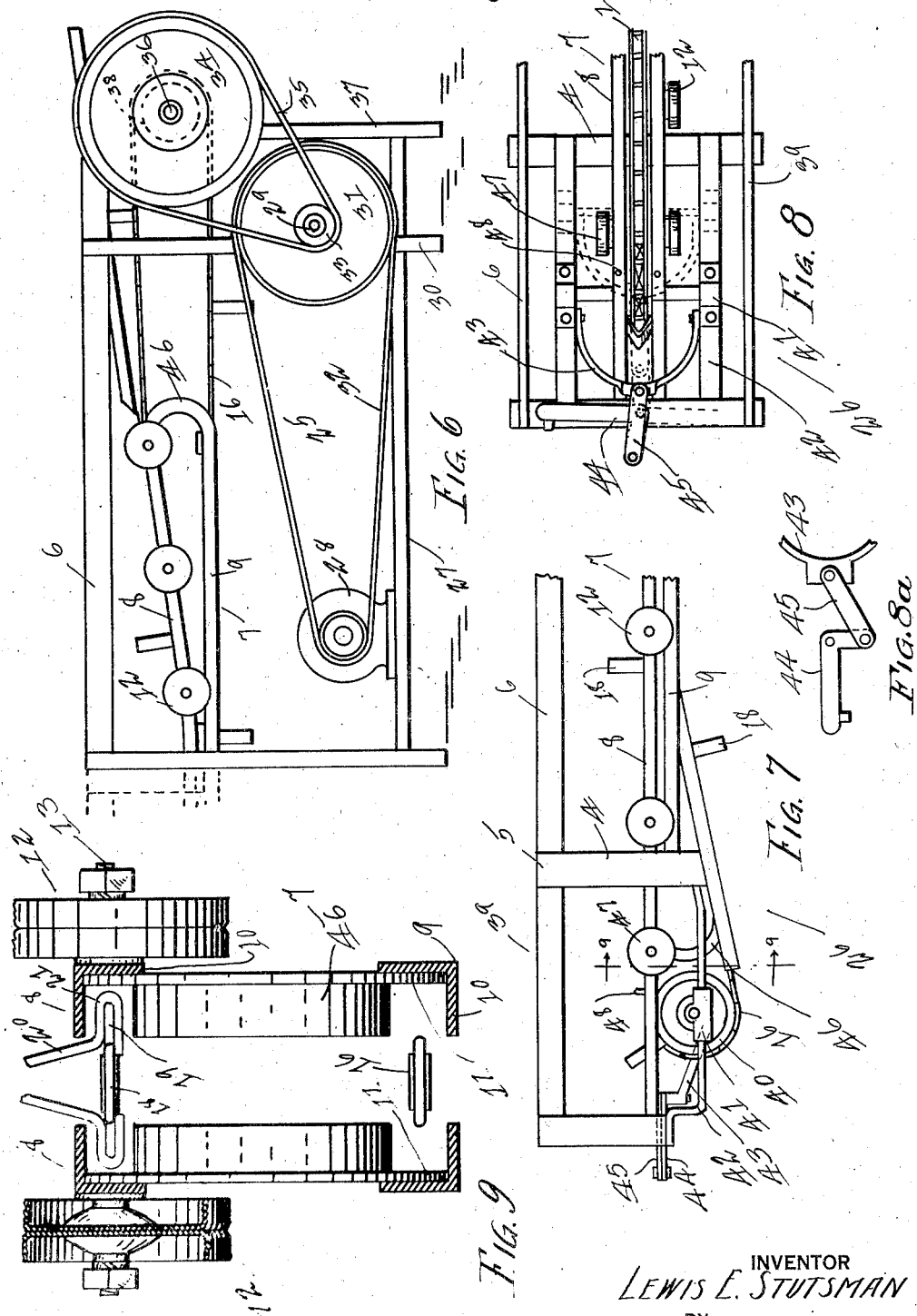
INVENTOR
LEWIS E. STUTSMAN
BY
ATTORNEY April 21, 1925.
L. E. STUTSMAN
CONVEYER SYSTEM
Filed Aug. 13, 1923  6 Sheets-Sheet 3
1,534,334
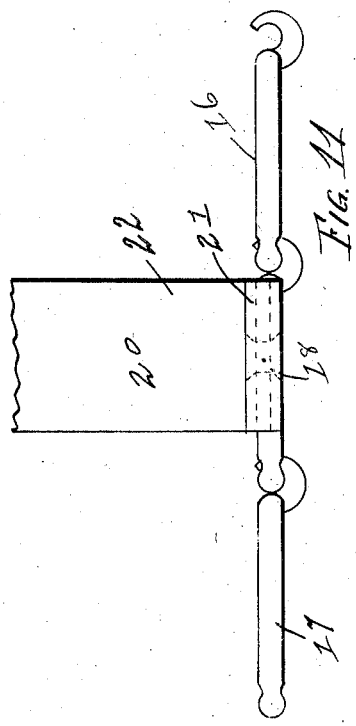
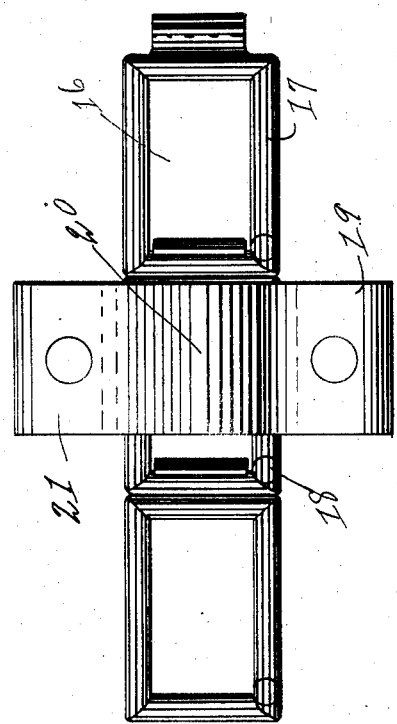
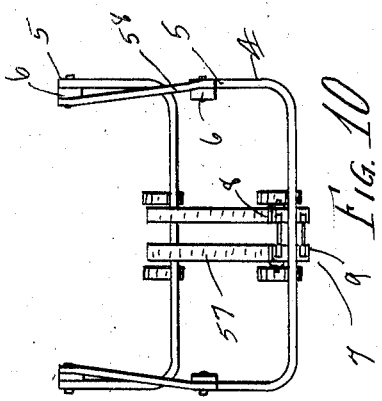
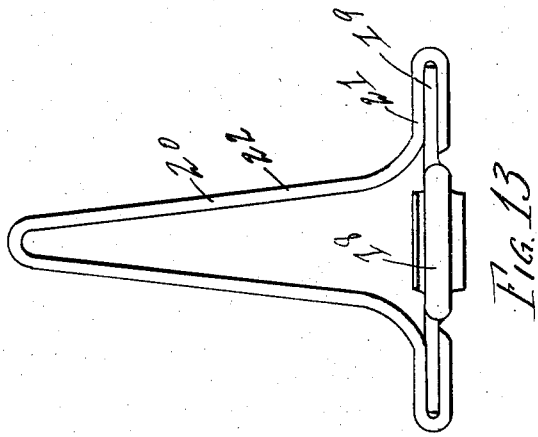
INVENTOR
LEWIS E. STUTSMAN
BY
ATTORNEY

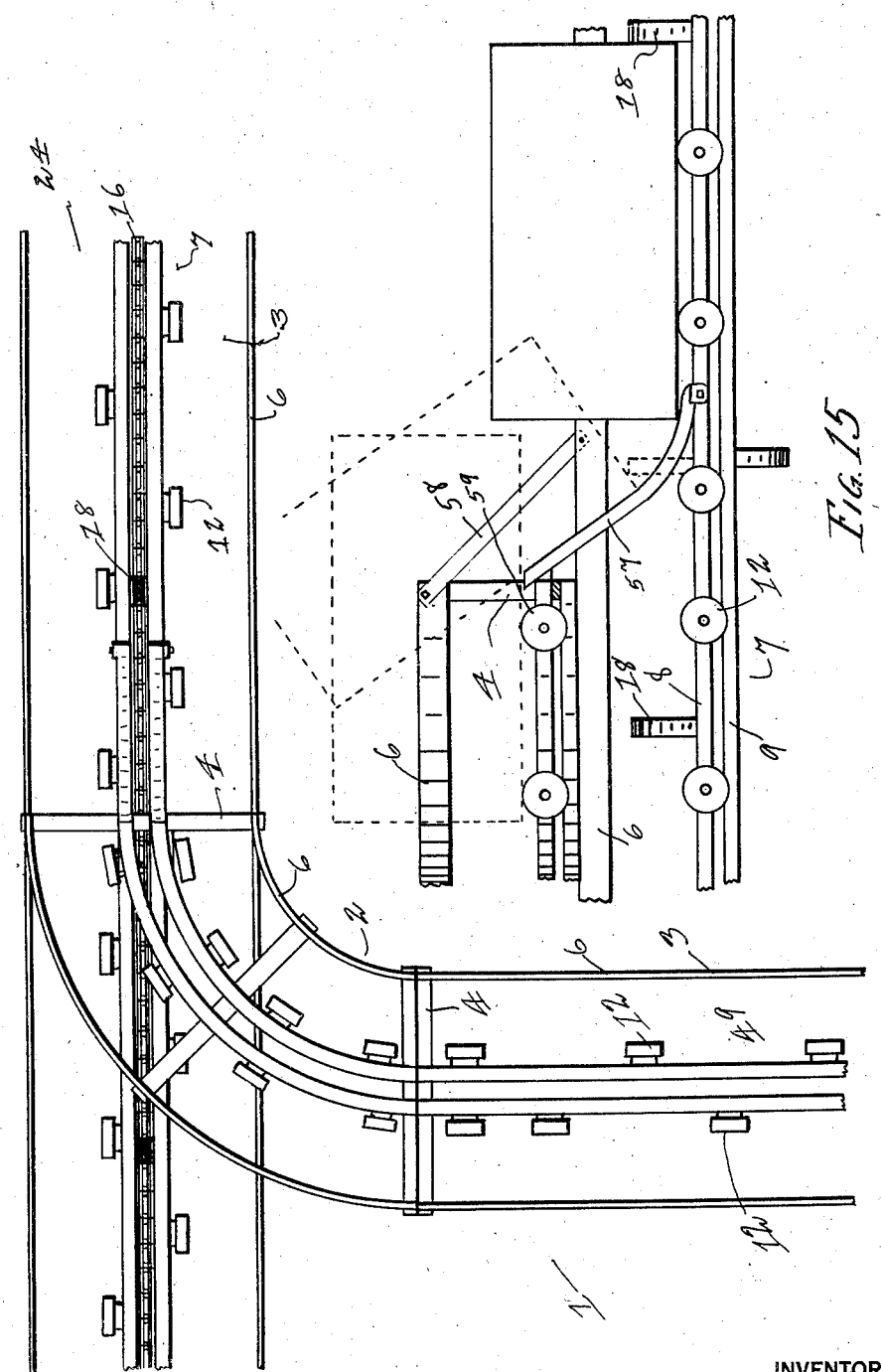

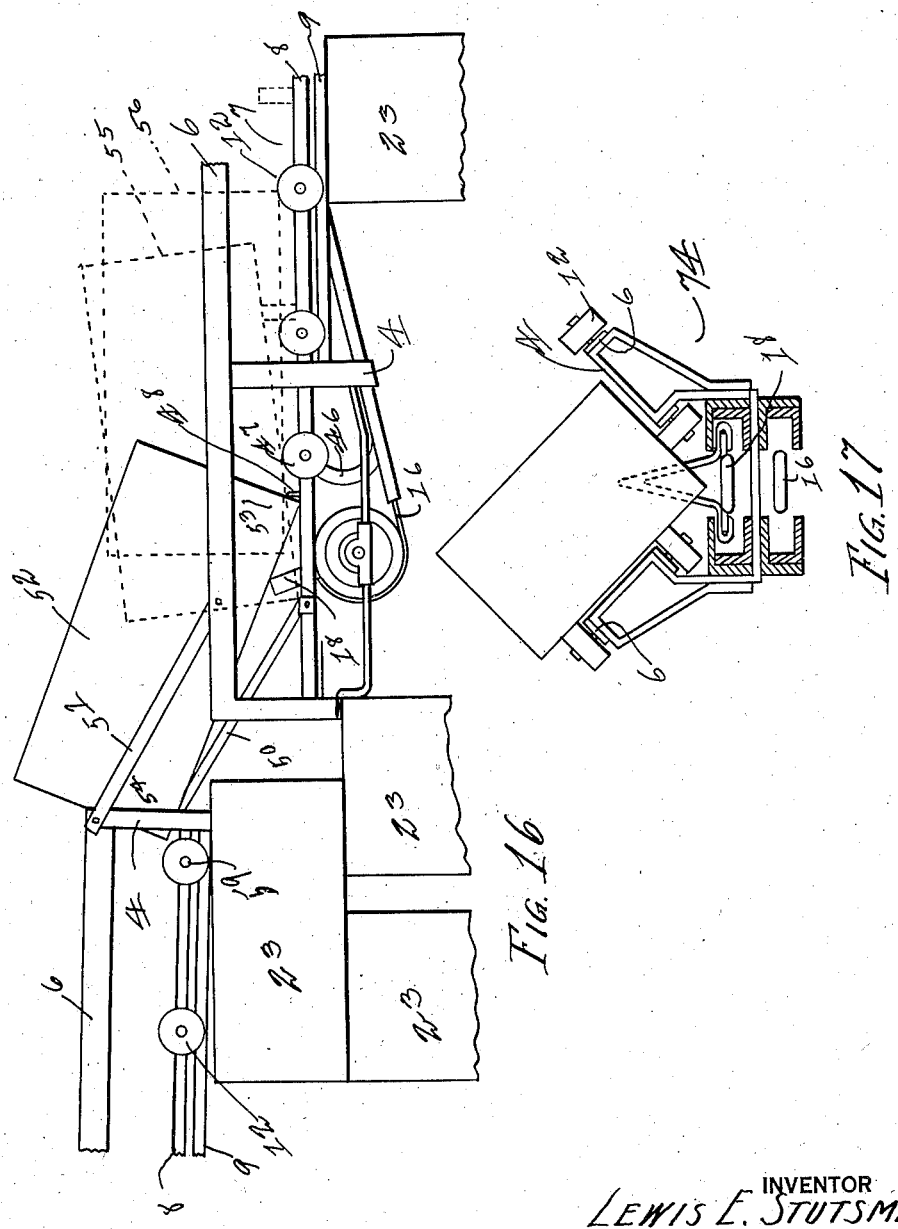

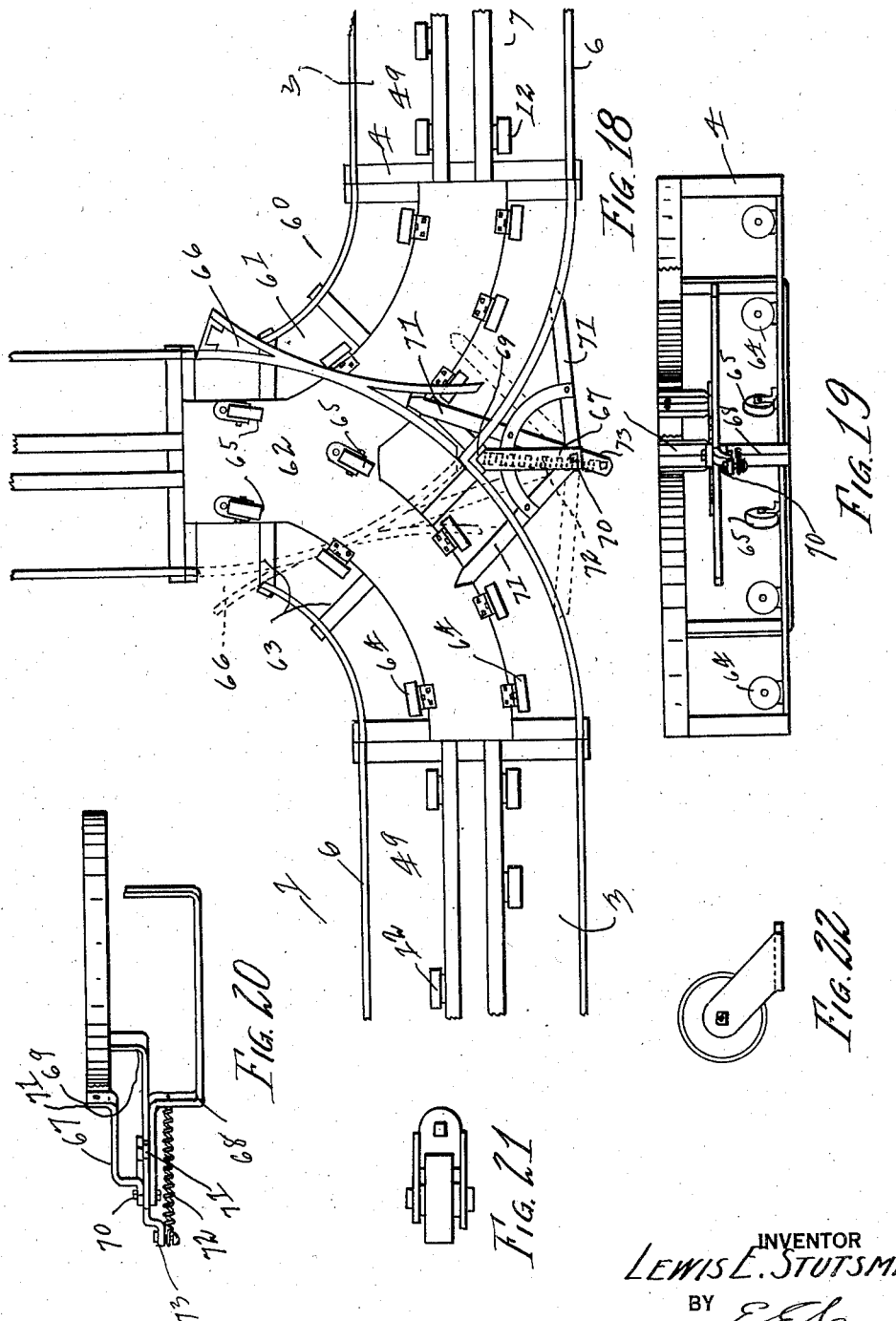

Patented Apr. 21, 1925.

1,534,334

UNITED STATES PATENT OFFICE.

LEWIS E. STUTSMAN, OF MILTON, OREGON.

CONVEYER SYSTEM.

Application filed August 13, 1923. Serial No. 657,088.

*To all whom it may concern:*

Be it known that I, LEWIS E. STUTSMAN, a citizen of the United States, residing at Milton, in the county of Umatilla and State of Oregon, have invented certain new and useful Improvements in Conveyer Systems, of which the following is a specification.

This invention relates to conveyer systems, comprising conveyers as may be adaptable to conveying solid and semisolid loads, of a crushable nature, such as boxed apples and other fruits, and has as one of its objects to provide a conveyer, operable by means of a movable chain, that consists of a plurality of units, forming a flexible track capable of versatile changes of direction and distance.

Another object of the invention is to provide a conveyer system having quick detachable units, that is portable, and provided with means for horizontal changes of direction.

A further object of the invention is to provide a conveyer system that combines power and gravity tracks, and whose power and gravity units are interconvertible.

A further object of the invention is to provide a conveyer system having power and gravity tracks, with switching means for directing the load from one branch to the other, and provide an alternator switch for the gravity track.

With these and other objects in mind reference is now had to the accompanying drawings in which:

Fig. 1 is a plan view of a fragment of the conveyer system showing various units, Fig. 2 is a perspective view of the female portion of a joint, Fig. 3 is a perspective view of the male portion of a joint, Fig. 4 is a plan view of part of the guides showing actual position assumed by the chain in making a horizontal curve, Fig. 5 is an end view of one of the units, Fig. 6 is a side elevation of the power head, Fig. 7 is a side elevation of the idler head, Fig. 8 is a plan view of the idler head showing tightening and locking means, Fig. 8ª is a plan view of the tightening and locking means, Fig. 9 is an enlarged sectional view on the line 9—9 of Fig. 7, Fig. 10 shows an end elevation of a switching means, from the power track to the gravity track, Fig. 11 is a side elevation of a conveyer link, Fig. 12 is a plan view thereof, Fig. 13 is an end elevation thereof, Fig. 14 is a plan view showing the power and gravity tracks with switching means in place, Fig. 15 is a side elevation of a switching means from the power track to the gravity track, Fig. 16 is a side elevation of a switching means from the gravity track to the power track, Fig. 17 is a sectional elevation of a modified form of conveyer, Fig. 18 is a plan view of a switching means on the gravity track, Fig. 19 is a side elevation thereof, Fig. 20 is a side elevation of the switch blade thereof, Fig. 21 is a plan view of a caster roller, and Fig. 22 is a side elevation of a caster roller.

Having reference to the drawings like numerals refer to like parts throughout the several views and the numeral 1 refers to the interconvertible tracks consisting of various units (or sections) of various curvatures and straight.

The curved tracks 2 are here shown as ¼ turns although it is obvious that ⅛ turns, etc., may be utilized should the occasion require, and these curved tracks are identical with the straight track 3 excepting, of course, their curvature, and a description of a straight track will cover the various units.

The tracks comprise supporting arms 4, substantially of the form of a U, and carry at their upper ends 5 rails 6 rigidly attached thereto and provided to act as guides and prevent accidental displacement of the load due to unevenness of the track and the like, which may occur.

Guide members 7 are also rigidly attached to the supporting arms 4 and are composed of two pairs of channel shaped guides 8 and 9, respectively, positioned centrally on the supporting arms and spaced apart laterally to accommodate a traveler chain, in a manner and for a purpose to be described.

The guides consist preferably of angle shapes 10 and 11, respectively, assembled to form channels, and one pair of channels 8 are attached to the top side of the supporting arms and form a forward guide and the other pair 9 are attached to the lower side of the supporting arms and form a return guide, both guides serving as braces to the track and, with the rail, providing a track that is very rigid and comparatively light.

Adjacent to the forward guides are rollers 12 which are preferably of the ball-bearing type and these rollers are secured to the guides by means of bolts 13 having countersunk heads (not shown) that pass through and secure the angle iron forms of the guides. The rollers are preferably staggered, as shown in the drawings, and are of a diameter sufficient to raise the face of the roller considerably above the guides and thus provide ample clearance between the guides and the loads. The rollers are also positioned with respect to the rails so that the center of gravity of the load will always be between the rollers and thus tend to keep the loads upright.

The track units are joined together at their ends by means of a tongue 14 and socket 15, one of each being provided at each end of the unit so that the ends may be interchanged, or the units may be interchanged and the curved and straight units joined in any combination according to the work demanded of the system.

The tracks may be of the gravity or power type, and in either case are identical in construction and are interconvertible for, by the addition of a traveler chain 16 mounted in the guides, which are prepared to receive the traveler as well as brace the track, a gravity track may be converted to a power track, and conversely, which obviates the necessity of providing extra tracks in place of either the power or gravity tracks, both of which are used extensively, and conjointly in the handling of fruit. That the change may be made readily the guides are spaced apart laterally a distance greater than the width of the traveler chain and provides for accessibility to the chain which may be conveniently drawn vertically from between the guides to connect or disconnect the links 17 thereof.

The traveler chain is provided, at intervals, with special links 18 having extended wings 19 engageable with the guide members 7, being slidably mounted therein, and a raised portion 20 engageable with the load.

The special links in this case are constructed by forming band iron 21 and a raised portion 22 and riveting the band iron to the wings 19 of the link 18. This gives greater projection to the wings desirable in the curved track units, to be presently explained, but obviously may be cast integral with the link.

The units of track are supported preferably by empty fruit boxes 23, these being convenient and light in weight to handle, and the special links are spaced so that the load on any unit will not be excessive for its supports.

The traveler 16 now being added to the track forms a power track 24 and to the power track is operably attached a power head 25 and an idle head 26. The power head comprises a frame, 27, a prime mover 28 mounted conveniently in the frame, and means operably connecting the prime mover with the traveler consisting of a shaft 29 suitably journaled against an upright 30 to the frame, a wheel 31 mounted on the shaft and connected to the prime mover by means of a belt 32 (or chain), and carrying a pinion 33 which in turn is suitably connected to a wheel 34, also by means of a belt 35 (or chain), with this wheel mounted on a sprocket wheel 38 to engage the traveler 16.

The idle head 26 is operably attached to the power track in a manner similar to the other units and comprises a frame 39 carrying a sprocket wheel 40 mounted on a shaft 40ᵃ that is rotatably mounted in journals 41.

The journals are slidably mounted on guide strips 42 that are rigidly attached to the frame in any suitable manner, and to the journals is fastened a yoke 43 that extends backward to connect with a bell crank 44 by means of a link 45. The bell crank is pivotally attached to the frame (as plainly shown in Fig. 8) and the link is pivotally attached to the short arm of the bell crank and to the yoke 43 in a manner that a rotating movement of the bell crank will impart a longitudinal movement to the yoke and sprocket wheel.

The short arm of the bell crank is positioned a little less than 90 degrees from the long arm so that when the crank is rotated to the position shown in Fig. 8, the link passes by the center of the pivotal point of the crank where it is held by the strain of the traveler on the sprocket wheel, etc.

By this means it is obvious that by rotating the bell crank the link will be drawn backward and this in turn will pull the sprocket wheel and take up the slack in the traveler chain. And as the traveler chain is fastened at the power head effort to draw the traveler toward the rear of the idle head will force the units together.

As this movement is old in the art further description is deemed unnecessary.

In both the power head 25 and the idle head 26 the angle irons 11 are joined together and form a vertical curved guide 46, as shown in Fig. 9, and by this means the traveler may be properly directed to the guide members whether moving in one direction or reversed, the reverse motion to the traveler being obtained by crossing the belt 32, and used, say, for receiving the load as against discharging it.

The traveler may now be moved forward or backwards and in its passage around the curved units the extended wings 21 of the special link 18 contacts one side of the guide members and the chain 16 assumes the shape shown in Fig. 4, utilizing the natural slack in the links, and is supported by the lower part of the guide members.

The heads are provided with rollers corresponding to the rollers 12 of the tracks and behind the roller 47 of the idle head, and attached to the forward guides 8 of the head are stops 48 consisting of pointed pins which will now be explained:

The gravity track 49 as above mentioned, is identical with the power track, 24 with the exception that the traveler 16 is removed. The gravity track is used where power is unnecessary, and obviously on an incline, and is for the purpose of moving goods to or from the power track by gravity. With an inclined gravity track bringing the goods to the power track the units of the load move more freely and without restraint but withall without sufficient congestion to break the supports, however as a load moves faster on the gravity track than on the power track congestion will occur at their junction and hence a means is provided to receive and separate the load on the power track 24, which means comprises declining guide members 50 rigidly attached to the guide members 8 of the power and gravity tracks, the declining members terminating back of and substantially in line with said stops 48, with rail braces 51 rigidly connecting the rails of the gravity and power tracks, to maintain the units in a proper operable position.

Now assuming that the load consists of boxes, and, referring to Fig. 16, that there is a congestion (not shown) back of the box 52 which is held against further forward movement by the stops 48. The link 18, in its revolution about the sprocket wheel 40 raises beneath the box and lifts its front end over the stop, and continuing, with this end resting on the link, and aided by gravity due to the declining guide members 50, the box is carried forward until its rear end 54 is caught as shown by the dotted lines 55 and held by the sharpened end of the stop, when the link moves out from under the box which now rest on the rollers as shown by the dotted lines 56. The released link will now obviously engage anything ahead of it and the following link, after separating another box from the congestion, will engage the box 52 and convey it to its destination.

The device has great value in loading cars which is accomplished by raising the receiving end of the gravity track placing the lower end in the car, and by discharging from the power track, by its own power, onto the elevated portion of the gravity track. In this case as before the gravity track includes inclining guide members 57 rigidly attached to the guide members 8 of the power and gravity tracks, and positioned to enable the special link 18 of the traveler 16 to pass therebetween, and to force the load up the incline and onto the gravity track, with rail members 58 rigidly uniting the rails of the power and gravity tracks.

The inclining guide members here terminate short of the roller 59 and, as soon as raised above the influence of the link 78, the load falls by gravity onto the rollers and moves to its destination.

While the loading of cars has been mentioned in connection with the gravity tracks, it is obvious that loads may be distributed elsewhere under similar conditions. Under the present system of loading cars one end only of a car can be loaded at a time, with a maximum of three men only working in the small space at one end of a car, but as the conveyer has sufficient speed for 6 men, a track is laid in both ends of a car and an alternating switch automatically divides the load and supplies both ends of the car at once, enabling six men to work, thereby filling the car in half the time.

This alternating switch is installed in the gravity tracks the same as other units and comprises a track 61 having a double curve, a plate 62 attached to the supporting arms 63 to carry stationary rollers 64 and, at the diverging point of the track, caster rollers 65. The rails 6 are removed a portion of the way and a switch tongue 66 is pivotally mounted on the track and positioned to close the gap left by the removed portion of the rail. Arms 67 and 68 extend from the united ends 69 of the supporting arms 63 and carries a bolt 70 on which the tongue is pivoted. The tongue has arms 71 extended substantially at right angles to the tongue and these arms rest normally in the path of the load and are operated by its movement against the arm, which movement causes the arm to advance and thus close the switch tongue 66 behind the load. This movement at the same time brings a second arm into the path as before with similar results.

The final closing of the tongue is accomplished by a spring 72 attached to an extended portion 73 of the tongue and to the supporting arm 68, the extended portion passing over center permits the spring to yieldingly draw the tongue into the above mentioned gap.

While a relatively flat track has been described, a V track 74, as shown in Fig. 17, is equally applicable for the uses and purposes herein shown and described, and reasonably comes within the scope of the claims.

In view of the above a detailed description of its uses is not deemed necessary and hence only a brief, general description will be given.

In use the gravity end of the system may be raised, or the power end of the system lowered, in both cases depending on the load to be moved. As soon as the system is properly positioned with respect to the work, the prime mover is started and moves the traveler. The load now travels to a predetermined destination and continuing completes the work.

Having thus described my invention I claim:

1. In a conveyer system an interconvertible track, rollers operably mounted on said track, a traveler operably mounted in said track to form a power track, means to operate said traveler, a stop rigidly attached to the power track, means to receive and separate the load on the power track from the gravity track, said means operably uniting said power and gravity tracks and means to elevate the load from the power track, by its own power, to the gravity track, said means operably uniting said tracks.

2. In a conveyer system an interconvertible track comprising supporting arms, rails attached to said arms, and guide members rigidly attached to said arms, centrally thereof, rollers operably mounted on said guide members, a traveler slidably mounted in the guide members of said track to form a power track, means attached to the power track to operate said traveler, a stop rigidly attached to the guides behind said rollers, means to receive and separate the load on the power track from the gravity track, said means comprising declining guide members rigidly attached to the guide members of the power and gravity tracks and terminating back of said stop, and rail braces rigidly connecting rails of the power and gravity tracks, means to elevate the load from the power track to the gravity track, said means comprising inclined guide members rigidly attached to the guide members of the power and gravity tracks, and positioned to enable the traveler to force the load up the incline and onto the gravity track, and rail members connecting the rails of the power and gravity tracks.

3. In a conveyer system an interconvertible track comprising supporting arms, rails rigidly attached to the upper portion of said arms, and guide members rigidly attached above and below said arms and positioned centrally thereof, rollers operably mounted adjacent to said guide members, a traveler comprising a detachable link sprocket chain and provided with special links having extended wings engageable in the guide members and a raised portion engageable with the load, said traveler forming with said track a power track, a power head operably attached to said power track, an idler head operably attached to said power track and provided with a tightening means for said traveler, said power head and said idler head provided with vertically curved guide members, means to receive and separate the load on the power track from the gravity track, said means comprising declining guide members rigidly attached to the guide members of the power and gravity tracks and positioned substantially in line with said guide members and rail braces rigidly connecting the rails of the power and gravity track and means to elevate the load from the power track to the gravity track, said means comprising inclined guide members rigidly attached to the guide members of the power and gravity tracks, and positioned to enable the traveler to force the load up the incline and onto the gravity track, and rail members connecting the rails of the power and gravity tracks.

4. In a conveyer system an interconvertible track consisting of interchangeable units of various curvatures and straight, each of said units comprising supporting arms, rails rigidly attached to the upper portion of said arms, forward guide members rigidly attached to the top side of said arms and return guide members rigidly attached to the lower side of said arms, both of said guide members serving as braces for said track, rollers operably mounted adjacent to said guide members, a traveler comprising a detachable link sprocket chain and provided with special links having extended wings engageable in the guide members and a raised portion engageable with the load, said traveler forming with said track a power track, a power head operably attached to said power track and comprising a frame, a prime mover mounted in said frame, and means operably connecting said prime mover with the traveler, an idle head operably attached to said power track and comprising a frame, an idle sprocket wheel slidably mounted in said frame and carrying said traveler, and means attached to said frame to slide said sprocket wheel to tighten said traveler, stops rigidly attached to the forward guides of said idle head behind the rollers thereof, said power head and said idle head provided with vertically curved guide members, means to receive and separate the load on the power track from the gravity track, said means comprising declining guide members rigidly attached to the guide members of the power and gravity tracks and positioned substantially in line with said stops, said stops acting to intercept the individual units of the load to permit the traveler to pick up and separate one part of the load from another, and rail braces rigidly connecting the gravity and power tracks, means to elevate the load from the power track to the gravity track, said means comprising inclined guide members rigidly attached to the guide members of the power and gravity tracks, and positioned to enable the traveler to force the load up the incline and onto the gravity track, and rail members connecting the power and gravity tracks.

5. In a conveyer system, an interconvertible track, consisting of interchangeable units of various curvatures and straight, each of said units comprising substantially U shaped supporting arms, rails rigidly attached to the upper portion of said arms to act as guides for the load, guide members rigidly attached to the top and lower sides of said arms serving as braces therefor, and spaced apart laterally a distance greater than the width of a traveler chain mountable therein, rollers operably mounted and said track, a traveller chain capable of being mounted in said track to form a power track, a power head operably attached to said power track to operate said traveler, an idle head operably attached to said power track and provided with a tightener for said traveler, rollers attached to said head, and stops attached to said head and positioned behind said rollers means cooperating with said stops to receive and separate the load on the power track from the gravity track, and means to elevate the load from the power track to the gravity track.

6. In a conveyer system, an interconvertible track comprising substantially U shaped supporting arms, rails rigidly attached to the upper portions of said arms, and guide members rigidly attached to said arms and comprising angle shapes assembled to form channels, said channels forming braces for said track and guides for a traveller chain and spaced apart laterally greater than the width of the traveller chain, rollers operably mounted on said track, a traveller comprising a detachable link sprocket chain and provided with special links engageable with said guides, said traveller forming with said track a power track, a power head operably attached to said power track, an idle head operably attached to said power track, a tightening means for said traveller operably attached to said idle head, said tightening means forming a lock for the conveyer system, stops attached to said head, said power head and said idler head provided with vertically curved guide members formed from said angle shapes, means to receive and separate the load on the power track from the gravity track said means comprising declining guide members rigidly attached to the guide members of the power and gravity tracks and positioned substantially in line with said stops, said stops acting to intercept the individual units of the load to permit the traveller to pick up and separate one part of the load from another, and rail braces rigidly connecting the rails of the power and gravity tracks, means to elevate the load from the power track to the gravity track, said means comprising inclined guide members rigidly attached to the guide members of the power and gravity tracks, and positioned to enable the traveller to force the load up the incline and onto the gravity track, and rail members connecting the rails of the power and gravity tracks.

7. In a conveyer system, in combination with interconvertible tracks, switching means to automatically and alternately change the direction of travel of the load on the gravity portion of said track, said means comprising a track, caster wheels mounted on said track, a switch tongue pivotally mounted on said track, arms extending substantially at right angles to said tongue and positioned normally in the path of the load, for operation thereby, and a yielding means to close, and maintain closed, said tongue.

In testimony whereof I affix my signature.

LEWIS E. STUTSMAN.